United States Patent
Getzin et al.

(10) Patent No.: US 7,103,734 B1
(45) Date of Patent: Sep. 5, 2006

(54) SYSTEM AND METHOD FOR IDENTIFYING EMPTY LOCATIONS IN A SCRAMBLED MEMORY

(75) Inventors: Lawrence D. Getzin, Falmouth, ME (US); David J. Fensore, New Gloucester, ME (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 358 days.

(21) Appl. No.: 10/424,454

(22) Filed: Apr. 28, 2003

(51) Int. Cl.
*G06F 12/00* (2006.01)
*G06F 13/00* (2006.01)

(52) U.S. Cl. .................. 711/156; 711/100; 711/154
(58) Field of Classification Search ............... 711/100, 711/154, 156, 200
See application file for complete search history.

(56) References Cited

U.S. PATENT DOCUMENTS

| | | | | |
|---|---|---|---|---|
| 5,970,208 A | * | 10/1999 | Shim | 386/126 |
| 6,125,433 A | * | 9/2000 | Horstmann et al. | 711/160 |
| 6,131,147 A | * | 10/2000 | Takagi | 711/159 |

\* cited by examiner

*Primary Examiner*—Tuan V. Thai (57) ABSTRACT

A system includes a memory operable to store scrambled data at a plurality of memory locations. The system also includes an empty detector operable to determine whether a specified memory location is empty using contents of the specified memory location. The contents of the specified memory location are not descrambled for use by the empty detector in determining whether the specified memory location is empty.

12 Claims, 4 Drawing Sheets

SYSTEM AND METHOD FOR IDENTIFYING EMPTY LOCATIONS IN A SCRAMBLED MEMORY

TECHNICAL FIELD

This disclosure is generally directed to communications systems and more specifically to a system and method for identifying empty memory locations in a scrambled memory.

BACKGROUND

Conventional cable systems use "set-top boxes" to deliver services to customers. For example, a set-top box may be placed on top of or near a customer's television. The set-top box typically receives cable signals, decrypts the cable signals, and communicates the decrypted cable signals for presentation to the customer through the television.

To provide security, information in an internal memory of the set-top box is typically scrambled. This often makes it difficult to identify empty locations in the memory. For example, the internal memory often includes a non-volatile memory. This type of memory typically can be programmed in one direction, such as where bits set to one can be changed to zero but bits set to zero cannot be changed to one without erasing or resetting the memory location. To write a value to a location in the non-volatile memory, the set-top box typically erases the location by setting all bits to one. However, the scrambling and descrambling of the data in the memory makes it difficult to determine whether a particular memory location has already been erased. As an example, it is often difficult for the set-top box to determine whether all of the bits in the memory location have been set to one.

SUMMARY

This disclosure provides a system and method for identifying empty memory locations in a scrambled memory.

In one embodiment, a method includes identifying a specified memory location in a memory. The method also includes determining whether the specified memory location has an address contained in a first address range or in a second address range. In addition, the method includes determining whether the specified memory location is empty based at least partially on contents of the specified memory location and on whether the address of the specified memory location is contained in the first address range or the second address range.

In another embodiment, a system includes a memory operable to store scrambled data at a plurality of memory locations. The system also includes an empty detector operable to determine whether a specified memory location is empty using contents of the specified memory location. The contents of the specified memory location are not descrambled for use by the empty detector in determining whether the specified memory location is empty.

In yet another embodiment, a set-top box includes a tuner operable to capture input signals from an external source and a demodulator operable to demodulate the captured input signals. The set-top box also includes a demultiplexer operable to select at least one desired signal from the demodulated input signals. The demultiplexer includes a memory operable to store scrambled data at a plurality of memory locations. The demultiplexer also includes an empty detector operable to determine whether a specified memory location is empty using contents of the specified memory location. The contents of the specified memory location are not descrambled for use by the empty detector in determining whether the specified memory location is empty.

One or more technical features may be present according to various embodiments of this disclosure. Particular embodiments of this disclosure may exhibit none, some, or all of the following features depending on the implementation. For example, in one embodiment, a system for identifying empty memory locations in a scrambled memory is provided. In particular, the system uses two memory mappings, each memory mapping associated with a different range of addresses that identify the same memory locations. When a read from an address in the address range associated with the first memory mapping is performed, the system may not care whether the accessed location is empty. This is useful, for example, when the memory location being accessed is occupied by instructions and therefore does not represent an empty location.

When a read from an address in the address range associated with the second memory mapping is performed, an empty detector determines whether the accessed location is empty. For example, the empty detector may retrieve the value stored at that location without descrambling the value. The empty detector then sets a flag identifying whether the retrieved value indicates that the accessed location is empty. In this way, the system can easily identify empty memory locations in the scrambled memory.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
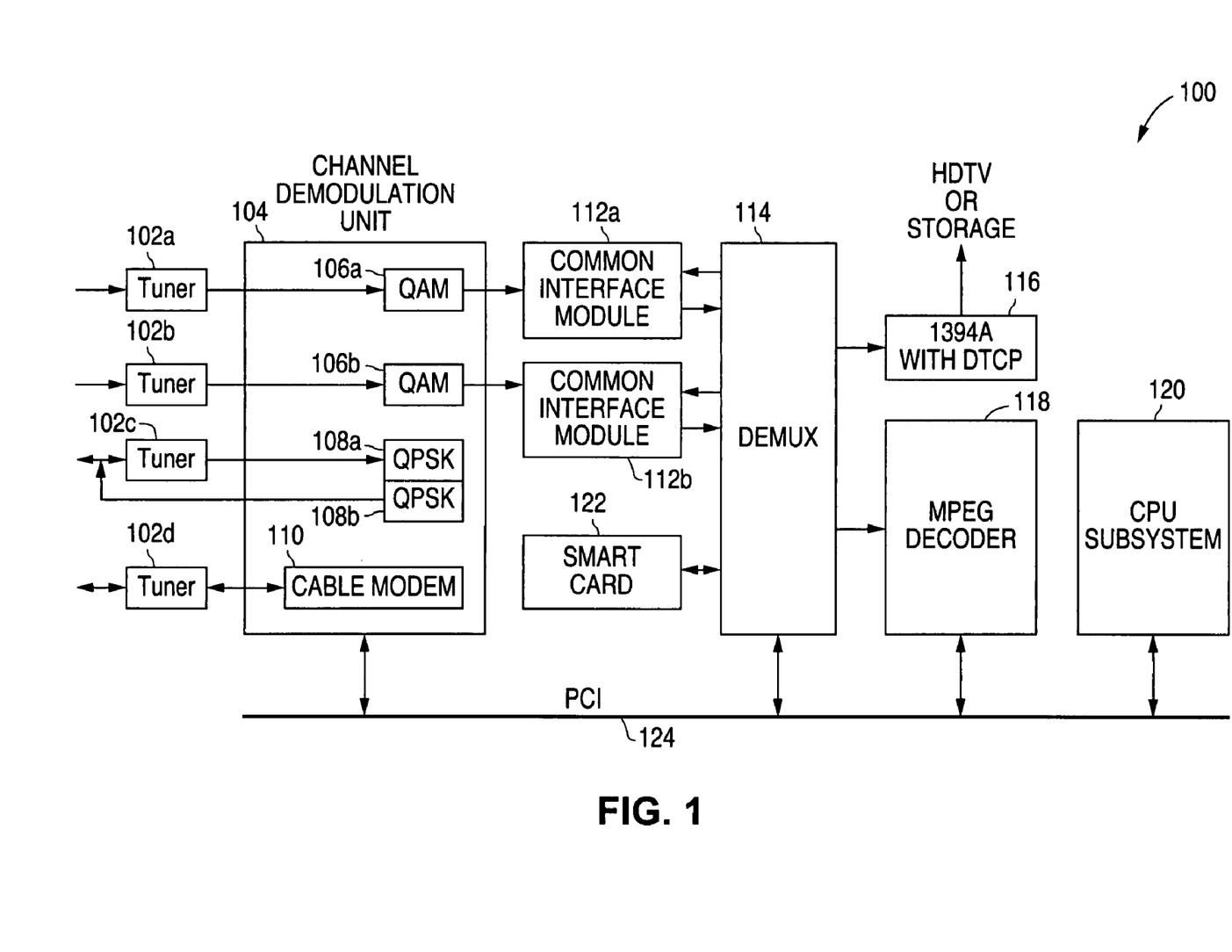
FIG. 1 illustrates an example set-top box according to one embodiment of this disclosure.

FIG. 1 illustrates an example set-top box 100 according to one embodiment of this disclosure. The set-top box 100 illustrated in FIG. 1 is for illustration only. Other embodiments of the set-top box 100 could be used without departing from the scope of this disclosure.

In the illustrated embodiment, the set-top box 100 includes one or more tuners 102a–102d. The tuners 102 are used to capture input signals from one or more external sources. In this example, different types of tuners 102 are used in the set-top box 100. For example, two tuners 102a and 102b are used to capture input signals from one or more digital coaxial cables. Another tuner 102c is used to capture input signals from a digital satellite system. A fourth tuner 102d is used to facilitate broadband computer access, such as by receiving data from and transmitting data to a coaxial cable. Each tuner 102 could include any hardware, software, firmware, or combination thereof for transmitting or receiving signals.

A channel demodulation unit 104 demodulates the input signals captured by the tuners 102. For example, the channel demodulation unit 104 may include one or more quadrature amplitude modulators (QAM) 106a and 106b. The quadrature amplitude modulators 106 demodulate input signals received over the digital coaxial cables. The channel demodulation unit 104 may also include one or more quadrature phase shift keying (QPSK) modulators 108a and 108b. The quadrature phase shift keying modulators 108 demodulate input signals received through the digital satellite system. The channel demodulation unit 104 may further include a cable modem 110, which allows broadband computer access. Each component shown in the channel demodulation unit 104 may include any hardware, software, firmware, or combination thereof operable to modulate or demodulate information transmitted or received by a tuner 102.

In this embodiment, two tuners 102a and 102b and two quadrature amplitude modulators 106a 106b are provided in the set-top box 100 to support a personal video recorder (PVR) architecture. In this architecture, one television program can be recorded while another program is being viewed by a customer.

One or more common interface modules 112a and 112b provide an interface for devices that support additional functions in the set-top box 100. For example, the common interface modules 112 may support the use of devices that provide decryption and pay television services or other forms of content protection access. The common interface modules 112 could represent any suitable hardware, software, firmware, or combination thereof for supporting the use of these or other devices. The use of the common interface modules 112 may be optional in the set-top box 100.

Figure 2:
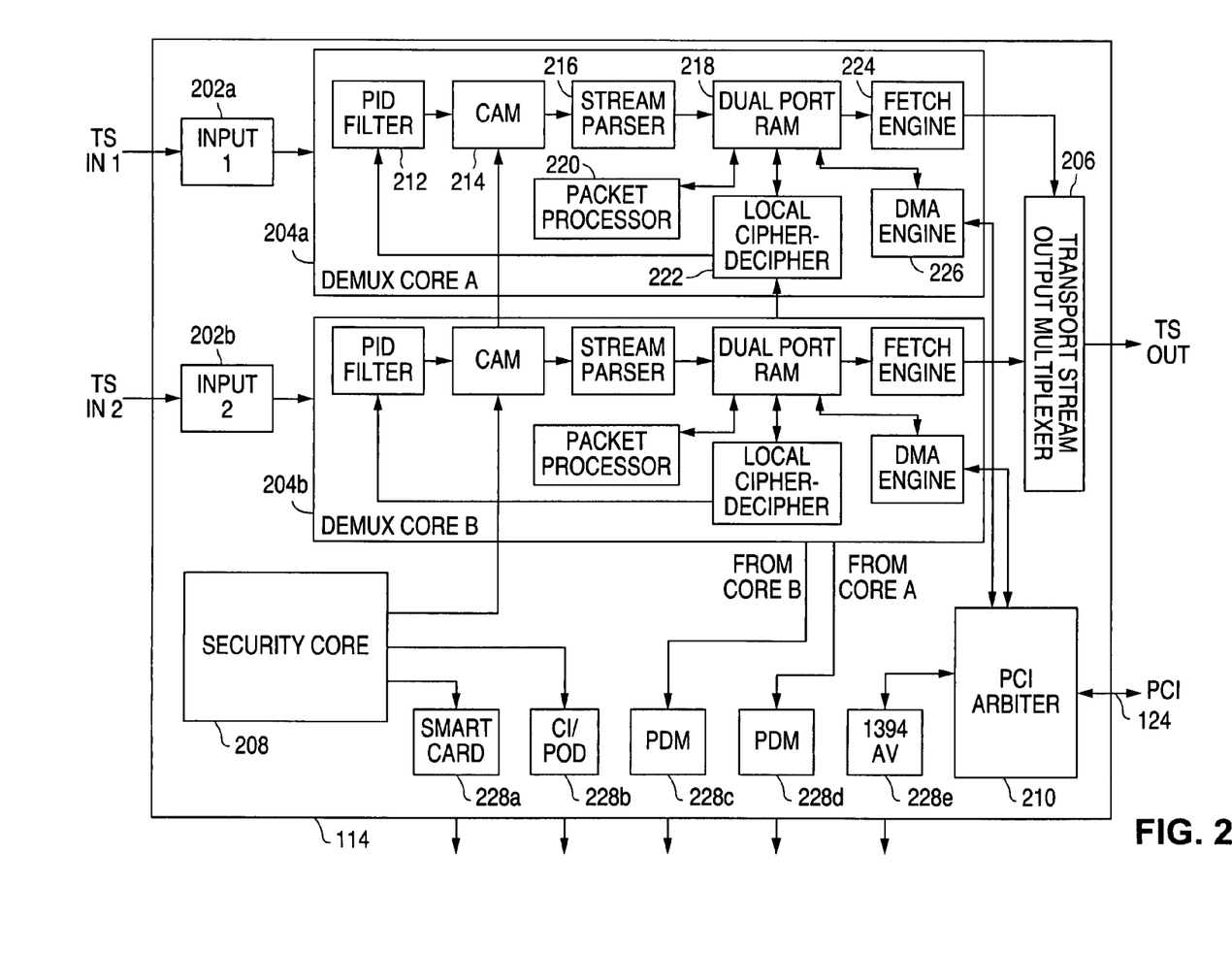
FIG. 2 illustrates an example demultiplexer according to one embodiment of this disclosure.

A demultiplexer (DEMUX) 114 supports the selection of particular signals from the input signals received by the tuners 102 and demodulated by the channel demodulation unit 104. For example, the input signals captured by a tuner 102a could include multiple television programs, and the demultiplexer 114 could select one of the programs for presentation to a customer through a television. The demultiplexer 114 could include any hardware, software, firmware, or combination thereof for retrieving one or more signals from a larger set of signals. One example of a demultiplexer 114 is shown in FIG. 2, which is described below. In one embodiment, the demultiplexer 114 represents a Motion Picture Experts Group (MPEG) demultiplexer capable of selecting signals from an MPEG transport stream.

An IEEE 1394A module 116 supports the transport of demodulated and demultiplexed data to a high-definition television (HDTV) or a storage device. The IEEE 1394A module 116 could also support communication using the digital transmission content protection (DTCP) scheme. The IEEE 1394A module 116 may include any hardware, software, firmware, or combination thereof for facilitating the communication of data. Any other or additional communication mechanisms could be used in the set-top box 100.

An MPEG decoder 118 decodes the signals selected by the demultiplexer 114. For example, the MPEG decoder 118 could decode information associated with the television program selected by a customer. The MPEG decoder 118 could include any hardware, software, firmware, or combination thereof for decoding MPEG signals. The MPEG decoder 118 could decode signals using any suitable encoding scheme, including the MPEG-1, MPEG-2, and MPEG-4 standards. Other or additional encoding schemes could be used in the set-top box 100.

A central processing unit (CPU) subsystem 120 controls the operation of the set-top box 100. For example, the CPU subsystem 120 could control a user interface that supports channel selection and program recording. The CPU subsystem 120 could include any suitable processor or processors.

A smart card 122 facilitates authorized use of the set-top box 100. For example, the smart card 122 may include data and logic that can be used by the set-top box 100 to determine whether the customer is authorized to use the set-top box 100. If the user does not have a smart card 122 or has an invalid smart card 122, the set-top box 100 may not operate. The smart card 122 could represent any suitable authorization device.

A peripheral component interconnect (PCI) bus 124 facilitates communication between the various components of the set-top box 100. For example, the PCI bus 124 could transport control instructions from the CPU subsystem 120 to the demultiplexer 114. In a particular embodiment, the PCI bus 124 represents a PCI 2.1 compliant bus. While FIG. 1 illustrates the use of a PCI bus 124, any other suitable bus or buses could be used in the set-top box 100.

Although FIG. 1 illustrates one example of a set-top box 100, various changes may be made to FIG. 1. For example, while FIG. 1 illustrates four tuners 102 and three types of tuners 102, any number or type of tuners 102 could be used in the set-top box 100. Also, any type of demodulation could be supported by the channel demodulation unit 104. In addition, FIG. 1 illustrates two tuners 102a and 102b, two quadrature amplitude modulators 106a and 106b, and two common interface modules 112a and 112b. Any number of these components could be provided in the set-top box 100.

FIG. 2 illustrates an example demultiplexer 114 according to one embodiment of this disclosure. In the illustrated embodiment, the demultiplexer 114 includes one or more input modules 202a and 202b, one or more demultiplexer cores 204a and 204b, an output multiplexer 206, and a security core 208. Other embodiments of the demultiplexer 114 could be used without departing from the scope of this disclosure.

The demultiplexer 114 shown in FIG. 2 may be compliant with any suitable standard. As particular examples, the demultiplexer 114 could be compliant with the Digital Video Broadcast (DVB) standard, the Advanced Television Systems Committee (ATSC) standard, or the DirectTV standard.

Each input module 202 receives a transport stream (TS) from a common interface module 112. The transport stream could contain various signals captured by a tuner 102 and then demodulated. For example, the transport stream could include audio and video information for multiple television programs. The input module 202 may represent any suitable structure operable to receive a transport stream.

Each demultiplexer core 204 operates to select one of the television programs contained in the transport stream. For example, each demultiplexer core 204 could select the audio and video information associated with a particular television program selected by a customer.

In the illustrated example, each demultiplexer core 204 includes a packet identifier filter (PID) 212. The PID filter 212 identifies packets contained in the transport stream that are associated with a particular television program. For example, in one embodiment, each television program is associated with a unique program identifier, and the packets containing audio or video information for a program contain that program's identifiers. The PID filter 212 may identify and select the packets for a particular program based on the program identifier contained in the packets. The PID filter 212 could include any hardware, software, firmware, or combination thereof that is operable to filter packets of data.

A conditional access module (CAM) 214 can support various functions in the set-top box 100. As an example, the conditional access module 214 could represent a decryption device used to support pay television services. As a particular example, the conditional access modules 214 could support the DVB, OpenCable, and DirectTV conditional access schemes. The conditional access module 214 may receive the packets associated with a pay television program and process the packets so that the program can be viewed by the customer.

A stream parser 216 parses the packets selected by the PID filter 212. For example, the packets may contain video or audio data for a particular television program. The stream parser 216 may parse the packets and extract encoding data contained in the packets. The stream parser 216 could represent any hardware, software, firmware, or combination thereof for parsing data from a sequence of packets.

A dual port random access memory (RAM) 218 stores the packets and the data extracted from the packets by the stream parser 216. The dual port RAM 218 could represent any suitable storage and retrieval device or devices.

A packet processor 220 processes the packets contained in the RAM 218. For example, the packet processor 220 could perform further filtering of the packets selected by the PID filer 212. The packet processor 220 could represent any suitable processor or combination of processors.

A local cipher-decipher 222 supports the deciphering of audio and video information contained in the RAM 218. For example, the local cipher-decipher 222 could support the 128-bit Advanced Encryption Standard (AES) and the triple Data Encryption Standard (DES). The local cipher-decipher 222 may include any hardware, software, firmware, or combination thereof for deciphering information.

A fetch engine 224 allows data to be retrieved from the RAM 218. For example, the fetch engine 224 could retrieve information to be sent to a television or storage device. A direct memory access (DMA) engine 226 allows direct memory access to the RAM 218. The fetch engine 224 and DMA engine 226 may each include any hardware, software, firmware, or combination thereof for retrieving information from a memory.

The output multiplexer 206 combines the output produced by both demultiplexer cores 204 into a single output stream. For example, multiple display devices could be connected to the set-top box 100 or a single display device could support picture-in-picture (PIP) or picture-out of-picture (POP) functions. In these cases, multiple television programs could be presented at the same time, and the output multiplexer 206 combines these programs into a single output stream. The output multiplexer 206 could represent any suitable multiplexer.

The security core 208 provides security for the set-top box 100. For example, the security core 208 could include an internal memory used to store security and encryption keys. A processor in the security core 208 could execute local programs stored on the internal memory. The processor could also execute programs stored externally to the security core 208. The security core 208 could represent any suitable processing system for supporting security in the set-top box 100.

The PCI arbiter 210 supports communication over the PCI bus 124. For example, the PCI arbiter 210 could facilitate the transmission and reception of data over the PCI bus 124. As a particular example, the PCI arbiter 210 could allow multiple components of the demultiplexer 114 to communicate over the PCI bus 124. The PCI arbiter 210 may include any hardware, software, firmware, or combination thereof that facilitates communication over a PCI bus 124.

Various interfaces 228–228e can be used to facilitate communication with the demultiplexer 114. For example, a smart card interface 228a allows information from a smart card 122 to be supplied to the security core 208. The security core 208 may then verify that the smart card 122 represents a valid card. The smart card interface 228a may, for example, represent an ISO 7816-3 smart card interface.

A common interface/point of deployment (CI/POD) interface 228b allows another security device to communicate with the security core 208. The security device could contain information used by the set-top box 100, such as security and encryption keys used by the security core.

Two pulse duration modulation (PDM) interfaces 228c and 228d are also provided in the demultiplexer 114. Pulse duration modulation represents a method of representing analog signal levels in a digital stream by varying the duration of pulses in the stream. Pulse duration modulation may, for example, be used for clock frequency control. A 1394 interface 228e facilitates communication over a standard IEEE 1394 link. Each interface 228 could represent any suitable hardware, software, firmware, or combination thereof for facilitating communication with the demultiplexer 114.

Although FIG. 2 illustrates one example of a demultiplexer 114, various changes may be made to FIG. 2. For example, while the demultiplexer 114 is shown as having two cores 204, any suitable number of demultiplexer cores 204 could be used. Also, any other or additional interfaces 228 could be used.

Figure 3:
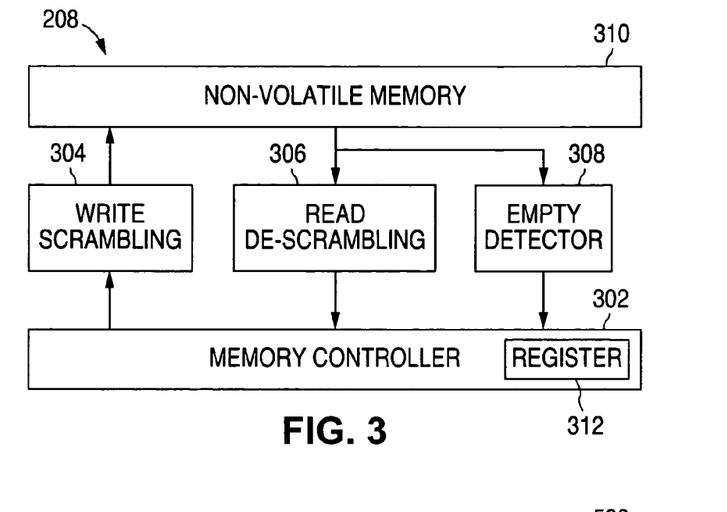
FIG. 3 illustrates a portion of an example security core according to one embodiment of this disclosure.

FIG. 3 illustrates a portion of an example security core 208 according to one embodiment of this disclosure. In the illustrated example, the security core 208 includes a memory controller 302, a write scrambling unit 304, a read de-scrambling unit 306, and an empty detector 308. The security core 208 also has access to a non-volatile memory 310. This illustrates one example embodiment of a portion of a security core 208. Other embodiments of the security core 208 could be used without departing from the scope of this disclosure.

The memory controller 302 controls access to the non-volatile memory 310 in the security core 208. For example, the memory controller 302 may receive a request to retrieve data from the non-volatile memory 310, and the memory controller 302 may identify the physical address of the requested data. The memory controller 302 may then initiate retrieval of data from the identified physical addresses. The memory controller 302 may include any hardware, software, firmware, or combination thereof for facilitating access to and use of a memory.

The write scrambling unit 304 scrambles data to be stored in the non-volatile memory 310. The write scrambling unit 304 may use any suitable encryption, coding, or other mechanism for scrambling the data to be written to the non-volatile memory 310. The write scrambling unit 304 may include any hardware, software, firmware, or combination thereof for scrambling data.

The read de-scrambling unit 306 unscrambles the data read from the non-volatile memory 310. The read de-scrambling unit 306 may use any suitable decryption, decoding, or other mechanism for de-scrambling the data read from the non-volatile memory 310. The read de-scrambling unit 306 may include any hardware, software, firmware, or combination thereof for descrambling data.

The empty detector 308 determines whether a memory location in the non-volatile memory 310 is empty. For example, the empty detector 308 may retrieve the value currently stored at a particular memory location. In a particular embodiment, all of the bits in an empty memory location in the non-volatile memory 310 have a value of one. This may be referred to as the "erase state." The empty detector 308 can determine if the identified memory location is empty by determining if all of the bits in the retrieved value have a value of one. The empty detector 308 may include any hardware, software, firmware, or combination thereof for determining if a memory location is empty. In this document, the term "empty" refers to the state of a memory location being available to store data. As a particular example, an empty memory location could contain a value identifying the erase state.

In one aspect of operation, the memory controller 302 may generate or otherwise have access to one or more mappings of the non-volatile memory 310. A mapping could represent an aliasing scheme that associates a range of physical memory addresses with a range of virtual memory addresses. As an example, in one mapping, a 128-byte portion of the memory 310 could have a starting address of 1,000. Another mapping could alias this portion of the memory 310 so that it has a starting address of 2,000. As a result, a read request to memory address 1,000 or memory address 2,000 would result in a read of the same memory location.

In this embodiment, the memory controller 302 may initiate a read from a memory address in the first mapping or a read from a memory address in the second mapping. A read from a memory address in the first mapping need not involve the operation of the empty detector 308. A read from a memory address in the second mapping causes the empty detector 308 to retrieve the value currently stored at that location and determine if the memory location is in the erase state.

If in the erase state, the empty detector 308 can set the value of a flag to indicate that the memory location is empty. In one embodiment, the flag represents a bit in a memory mapped register 312 in the memory controller 302. The memory controller 302 can then decide whether to erase the memory location by examining the flag. If the flag indicates that the memory location is empty, the memory controller 302 can write data to the memory location. If the flag indicates that the memory location is not empty, the memory controller 302 may take any suitable action, such as erasing the memory location and then writing data to the memory location.

In a particular embodiment, the flag is only set when a read from the second mapping occurs. The flag is not set when a read from the first mapping occurs. The use of two mappings may allow the security core 208 to execute instruction fetches from the same non-volatile memory 310 that is used by the empty detector 308 to identify empty locations.

In conventional systems, each value retrieved from the non-volatile memory 310 is typically de-scrambled. However, the value contained in an empty memory location is usually not scrambled. As a result, the conventional systems attempted to de-scramble an unscrambled value. In one embodiment, the empty detector 308 of FIG. 3 can retrieve and process the value directly from the memory 310. The empty detector 308 need not wait for the read de-scrambler 306 to descramble the value and then process the descrambled value.

Although FIG. 3 illustrates a portion of an example security core 208, various changes may be made to FIG. 3. For example, any number of non-volatile memories 310 could be used in the security core 208. Also, the flag set by the empty detector 308 could reside in any other register or memory in any other location.

Figure 4:
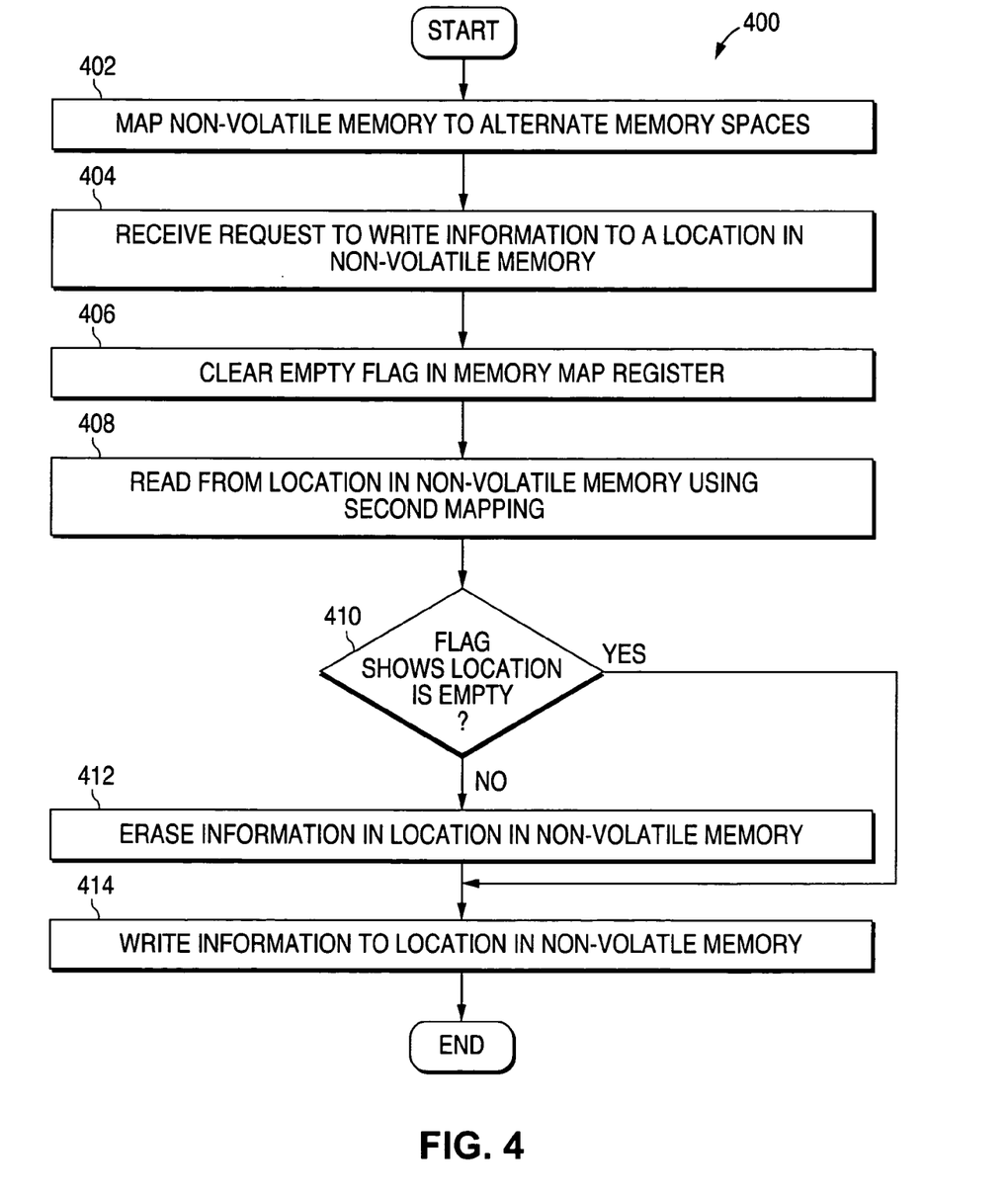
FIG. 4 illustrates an example method for storing information in a scrambled memory.

FIG. 4 illustrates an example method 400 for storing information in a scrambled memory. The method 400 may be described with respect to the security core 208 illustrated in FIG. 3. The method 400 could also be executed by any other suitable system or device.

Memory locations in a non-volatile memory are mapped to alternate memory spaces at step 402. This may include, for example, the memory controller 302 generating two mappings for at least a portion of a non-volatile memory 310. The mappings may include different address ranges representing the portion of the memory 310.

A request to write information to a particular memory location is received at step 404. This may include, for example, the memory controller 302 receiving a request to write data to a specified memory location in the non-volatile memory 310.

A flag used to identify whether the memory location is empty is cleared at step 406. This may include, for example, the memory controller 302 setting a bit in the memory mapped register 312 to a default value, such as a value of zero.

A read from the memory location is performed using the second memory mapping at step 408. This may include, for example, the memory controller 302 initiating a read operation using the address of the memory location from the second mapping. This may also include the memory controller 302 allowing the empty detector 308 to operate and set the flag.

The flag is examined to determine whether the specified memory location is empty at step 410. This may include, for example, the memory controller 302 determining whether the appropriate bit in the memory mapped register 312 indicates that the memory location is empty.

If not empty, the memory location is cleared at step 412. This may include, for example, the memory controller 302 initiating a reset of the memory location in the non-volatile memory 310, causing all bits in the memory location to be set to one.

If the memory location is empty at step 410 or after the clearing at step 412, the information is written to the memory location at step 414. This may include, for example, allowing the write scrambling unit 304 to scramble the information before it is stored in the non-volatile memory 310.

Although FIG. 4 illustrates one example of a method 400 for storing information in a scrambled memory, various changes may be made to FIG. 4. For example, the flag could be cleared before the request to write the information is received.

Figure 5:
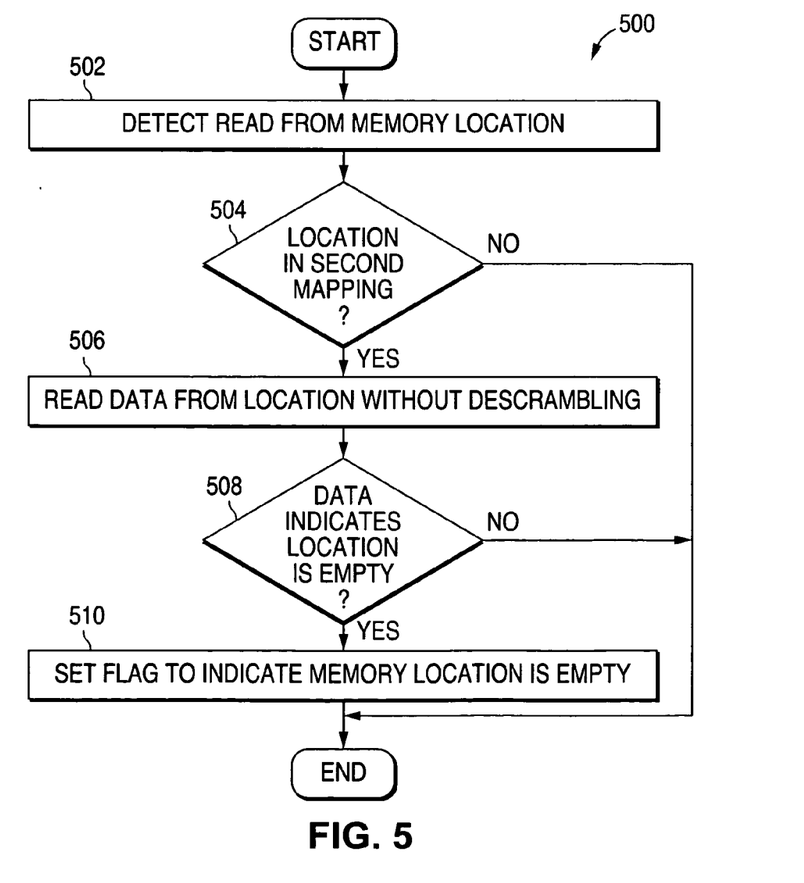
FIG. 5 illustrates an example method for identifying empty memory locations in a scrambled memory.

FIG. 5 illustrates an example method 500 for identifying empty memory locations in a scrambled memory. The method 500 may be described with respect to the security core 208 illustrated in FIG. 3. The method 500 could also be executed by any other suitable system or device.

A request to read information from a particular memory location is detected at step 502. This may include, for example, the empty detector 308 receiving the read request from the memory controller 302 or detecting the memory controller 302 communicating the read request to the read de-scrambler 306.

The memory location is examined to determine if it is contained in the address range associated with the second memory mapping at step 504. This may include, for example, the empty detector 308 determining whether the specified memory location is contained in the second memory mapping generated at step 402 in FIG. 4.

If the specified memory location is contained in the first memory mapping, the method 500 ends. The empty detector 308 need not take any other actions. If the specified memory location is contained in the second memory mapping, the data currently contained in the specified memory location is read at step 506. This may include, for example, the empty detector 308 examining the data from the memory 310 when it is read by the read-descrambler 306. The data need not be descrambled by the read de-scrambler 306 before being processed by the empty detector 308.

The data is examined to determine if it indicates that the memory location is empty at step 506. This may include, for example, the empty detector 308 determining whether all bits in the retrieved data are set to one, which may represent the erase state of a memory location.

If the retrieved data represents the erase state, a flag is set to indicate that the memory location is empty at step 510. This may include, for example, the empty detector 308 setting a bit in the memory mapped register 312 to indicate that the memory location is empty. The memory controller 302 may then use the flag and store data in the memory location. Otherwise, the method 500 ends, and the flag indicates that the memory location is not empty. The memory controller 302 may then use the flag and reset the memory location before storing data in the memory location.

Although FIG. 5 illustrates one example of a method 500 for identifying empty memory locations in a scrambled memory, various changes may be made to FIG. 5. For example, the data in the specified memory location could be examined before the address of the memory location is compared to the memory mappings.

The above description has described a system and method for identifying empty memory locations in a scrambled memory. In particular, the system and method have been described as being implemented in a cable set-top box 100. However, the system and method could be implemented in any other system that includes, has access to, or otherwise uses a scrambled memory. As particular examples, the system and method could be used in a personal computer, a processor, or any other integrated circuit, device, or system.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:

identifying a specified memory location in a memory;

determining whether the specified memory location has an address contained in a first address range or in a second address range; and determining whether the specified memory location is empty based at least partially on contents of the specified memory location and on whether the address of the specified memory location is contained in the first address range or the second address range, wherein determining whether the specified memory location is empty comprises retrieving the contents of the specified memory location from the memory, and wherein the retrieved contents have not been descrambled.

2. The method of claim 1, wherein determining whether the specified memory location is empty comprises comparing the contents of the specified memory location to an erase state.

3. The method of claim 2, wherein the erase state comprises a predetermined value.

4. The method of claim 1, wherein identifying the specified memory location comprises receiving a request to write data to the specified memory address.

5. The method of claim 1, wherein the first address range is associated with a first memory mapping of the memory and the second address range is associated with a second memory mapping of the memory.

6. A system, comprising:

a memory operable to store scrambled data at a plurality of memory locations; and an empty detector operable to determine whether a specified memory location is empty using contents of the specified memory location, wherein the contents of the specified memory location are not descrambled for use by the empty detector in determining whether the specified memory location is empty.

7. The system of claim 6, wherein the empty detector is operable to determine whether the specified memory location is empty by:

determining whether the specified memory location has an address contained in a first address range or in a second address range; and determining whether the specified memory location is empty based at least partially on contents of the specified memory location and on whether the address of the specified memory location is contained in the first address range or the second address range.

8. The system of claim 6, further comprising:

a write scrambler operable to scramble the data before storage in the memory; and a read de-scrambler operable to de-scramble the data after retrieval from the memory.

9. The system of claim 6, wherein the empty detector is operable to determine whether the specified memory location is empty by comparing the contents of the specified memory location to an erase state.

10. The system of claim 6, further comprising a memory controller coupled to the empty detector and operable to control storage of data in and retrieval of data from the memory.

11. The system of claim 6, wherein:

the empty detector is operable to set a flag indicating whether the specified memory location is empty; and the memory controller is operable to:

store a value in the specified memory location when the flag indicates that the specified memory location is empty; and clear the specified memory location and then store the value in the specified memory location when the flag indicates that the specified memory location is not empty.

12. A method comprising:

identifying a specified memory location in a memory;

determining whether the specified memory location has an address contained in a first address range or in a second address range; and determining whether the specified memory location is empty based at least partially on contents of the specified memory location and on whether the address of the specified memory location is contained in the first address range or the second address range, wherein determining whether the specified memory location is empty comprises comparing the contents of the specified memory location to an erase state, and wherein the erase state comprises a predetermined value.

* * * * *